United States Patent
AC et al.

(10) Patent No.: US 11,341,571 B1
(45) Date of Patent: May 24, 2022

(54) RISK ASSESSMENT IN LENDING

(71) Applicant: Wells Fargo Bank, N.A., San Francisco, CA (US)

(72) Inventors: Hemalatha AC, Bangalore (IN); Dipan Banerjee, Bangalore (IN); Naveen Yeri, Bangalore (IN); Srimoyee Duttagupta, Bangalore (IN); Pranshu Sharma, New Delhi (IN); Alan On Yau, Tustin, CA (US); Michelle Sunna Nowe, South Pasadena, CA (US); Manesh Saini, New York City, NY (US); Hasan Yilmaz, San Diego, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 7 days.

(21) Appl. No.: 16/783,977

(22) Filed: Feb. 6, 2020

(51) Int. Cl.
*G06Q 40/02* (2012.01)
*G06Q 10/06* (2012.01)
*G06Q 40/08* (2012.01)

(52) U.S. Cl.
CPC ..... *G06Q 40/025* (2013.01); *G06Q 10/06393* (2013.01); *G06Q 40/08* (2013.01)

(58) Field of Classification Search
CPC . G06Q 40/025; G06Q 10/06393; G06Q 40/08
USPC ........................................ 705/3–44
See application file for complete search history.

(56) References Cited

U.S. PATENT DOCUMENTS

| | | | | |
|---|---|---|---|---|
| 8,355,983 B1* | 1/2013 | Parr | ..................... | G06Q 40/025 705/38 |
| 8,521,631 B2* | 8/2013 | Abrahams | .............. | G06Q 40/02 705/36 R |
| 8,639,618 B2* | 1/2014 | Yan | ...................... | G06Q 10/067 705/38 |
| 8,831,985 B2* | 9/2014 | Malackowski | ........ | G06Q 40/04 705/35 |
| 9,860,391 B1* | 1/2018 | Wu | ................... | H04M 3/42068 |
| 9,898,772 B1* | 2/2018 | Word | ................. | G06Q 30/0631 |
| 10,540,714 B1* | 1/2020 | Taylor | .................... | G06Q 40/02 |
| 10,891,629 B1* | 1/2021 | Barakat | ................ | H04M 3/5233 |
| 2009/0299911 A1* | 12/2009 | Abrahams | .............. | G06Q 40/00 705/36 R |
| 2010/0293039 A1* | 11/2010 | Whitsitt | ............... | G06Q 10/063 705/7.42 |

(Continued)

OTHER PUBLICATIONS

Turisco, Fran, "How to justify the investment", Health Management Technology 21.3: 12-3, Endeavor Business Media, March (Year: 2000).*

*Primary Examiner* — Frantzy Poinvil
(74) *Attorney, Agent, or Firm* — Womble Bond Dickinson (US) LLP

(57) ABSTRACT

Risk assessment can be performed in many contexts including in lending. A set of metrics can be received and derived from data associated with a party, such as a third-party retailer or dealer, with respect to performance of an activity. A subset of metrics can be identified that exceed a threshold of acceptable performance. Weights can be applied to at least the subset of metrics that captures significance of corresponding metrics. A single weighted score can be computed from aggregation of the weighted subset of metrics, and a third party can be classified based on comparison of the weighted score to a predetermined threshold.

20 Claims, 11 Drawing Sheets

(56) References Cited

U.S. PATENT DOCUMENTS

| | | | |
|---|---|---|---|
| 2012/0246060 A1* | 9/2012 | Conyack, Jr. | G06Q 40/02 |
| | | | 705/38 |
| 2013/0332238 A1* | 12/2013 | Lyle | G06Q 30/0201 |
| | | | 705/7.34 |
| 2014/0279393 A1* | 9/2014 | Coomes | G06Q 40/025 |
| | | | 705/38 |
| 2015/0106258 A1* | 4/2015 | Coomes | G06Q 40/025 |
| | | | 705/38 |
| 2016/0104216 A1* | 4/2016 | Turner | G06Q 10/10 |
| | | | 705/347 |
| 2018/0096283 A1* | 4/2018 | Wang | G10L 15/08 |
| 2018/0096675 A1* | 4/2018 | Nygaard | G06F 9/5027 |
| 2019/0197011 A1* | 6/2019 | Zavesky | G06N 20/00 |
| 2021/0407000 A1* | 12/2021 | De Suza | G06N 20/00 |

* cited by examiner

| | | | | | | |
|---|---|---|---|---|---|---|
| Dealer Name: ABC | | | | | | |
| Loan number | Nonprime | 30 Days past due | Back end charges | Acquisition fee >599 | GAP insurance | |
| 100 | 0 | 1 | 0 | 0 | 0 | |
| 120 | 0 | 0 | 0 | 0 | 0 | |
| 140 | 1 | 0 | 0 | 0 | 0 | |
| 180 | 0 | 0 | 0 | 500 | 0 | |
| 200 | 1 | 0 | 70 | 1300 | 0 | 602 |
| 300 | 0 | 0 | 0 | 0 | 0 | |
| 302 | 0 | 0 | 0 | 0 | 0 | |
| 308 | 0 | 0 | 0 | 2656 | 0 | |
| 400 | 1 | 0 | 0 | 0 | 0 | |
| 450 | 0 | 0 | 0 | 0 | 0 | |
| 543 | 0 | 0 | 0 | 0 | 0 | |
| 600 | 0 | 0 | 0 | 0 | 0 | |
| 650 | 0 | 0 | 0 | 2574 | 0 | |
| Aggregation at dealer level | | | | | | |
| Dealer | Booked loans | Nonprime | 30 Days past due | Back end charges | GAP insurance | 604 |
| ABC | 13 | 3 | 1 | 1 | 0 | |
| Proportion of booked loans | | | | | | |
| Dealer | Booked loans | Nonprime | 30 Days past due | Back end charges | GAP insurance | |
| ABC | 13 | 23% | 8% | 8% | 0 | 606 |
| Thershold | | >18 | >12 | >7 | >900 | |
| Weight | | 1 | 0.5 | 1 | 0.25 | |
| Risk Flag based on threshold | | | | | | |
| Dealer | | Nonprime | 30 Days past due | Back end charges | GAP insurance | 608 |
| ABC | | 1 | 0 | 1 | 0 | |
| Weighted Score : 2 | | | | | | |

FIG. 6

| Metrics | Definition |
|---|---|
| Nonprime_ratio | Proportion of loans lend to nonprime customers |
| NonPrime_Elevated_Risk_ratio | Proportion of nonprime loans with performance outlier flag (payment to income(PTI)>=12 and Loan to value (LTV)>1.35) |
| Prime_Elevated_Risk_ratio | Proportion of prime loans with performance outlier flag (PTI>=12 and LTV>1.35) |
| NONPRIME_ACQFEE_GT499_ratio | Proportion of nonprime with acquisition fee greater than 499 |
| NONPRIME_AcqFee_Waived_ratio | Proportion of nonprime loans with acquistion fee waived |
| FrdScore200_Flag_ratio | Proportion of loans with fraud score 200 |
| Prime_POI_Waiver_ratio | Proportion of prime loans with proof of income waived |
| FrdScore202_Flag_ratio | Proportion of loans with 'Applicants first and last name could not be verified with at least one of the following : address, telephone number, SSN |
| newused_ratio | Proportion of used cars |
| thinfile_flag_ratio | Proportion of loans without Bureau score |
| ATP_Fail_ratio | Proprotion of loans with ability to pay status as 'Fail' |
| FUNDING_DELAY_ratio | Proportion of loans with unbookable='Yes' |
| CRS_Alert_Flag_ratio | Proportion of loans with fraud flag (Consumer flag, zipcode, age fraud) |
| NonPrime_POI_Waiver_ratio | Proportion of nonprime loans with proof of income waived |
| AMT_penetration_ratio | Proportion of loans with backend amount greater than zero |
| AfterMarket_Exception_flag_ratio | Proportion of loans with book value greater than 10,000 and backend amount is greater than 25% of book value or Book value <10000 and backend amount >2500 |
| dlr_bkend_stacking_ratio | Proportion of loans with backend products >= 4 |
| BuyDown_Red_Flag_ratio | Proportion of loans with contract rate less than buy rate |
| Bureau_Alert_Flag_ratio | Proportion of loans with bureau alert flag |
| Gap_Red_Flag_ratio | Proportion of loans with Gap amount greater than $999 |
| First_Payment_Default | Proportion of loans with first payment default |
| Ever30_By_3MOB_ratio | Proportion of loans with 30 days delinquency with 3 months on book |
| Ever60_By_6MOB_ratio | Proportion of loans with 60 days delinquency with 6 months on book |
| Ever90_By_9MOB_ratio | Proportion of loans with 90 days delinquency with 9 months on book |
| EPD_FLag_ratio | Proportion of loans with early payment default |
| co_flag_ratio | Proportion of loans with charge off flag |

FIG. 10

RISK ASSESSMENT IN LENDING

BACKGROUND

Financing is often employed for large purchases such as vehicles. Financial institutions, such as banks, can lend money to individuals for a vehicle purchase. In this context, the lending can be direct or indirect. In a direct lending situation, a customer acquires funds directly from a financial institution. Indirect lending involves acquiring financing through a third party such as a dealer rather than directly from a financial institution.

Financial institutions have responsibilities not only for direct lending but also for indirect lending. More particularly, regulatory compliance is required for indirect lending situations. In furtherance of ensuring compliance, a financial institution can collect metrics pertaining to a loan and loan applicant. Such metrics can include a loan to value ratio, additional charges made by a dealership (e.g., extended warranty, gap coverage . . . ). Once a loan is approved metrics can also be captured regarding whether or not payments are being made on time. Financial institutions review metrics independently to determine compliance with regulatory requirements.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to risk assessment. A plurality of metrics can be monitored and utilized to assess risk, including compliance risk. Metrics can be computed on a subject level, such as a dealer level. The metrics can be analyzed to determine a threshold utilized to identify key metrics for consideration. Weights can be determined and assigned to metrics to capture significance of the metric to the risk assessment. Key metrics and corresponding weights can subsequently be aggregated to determine a score. The score can subsequently be used as a basis to tag a dealer as high or low risk. In one instance, the scores and risk level of one or more dealers can be captured and presented in a graphical scorecard.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

FIG. 6 illustrates a data collection associated with an example embodiment.

FIG. 10 is a table of sample dealer-level metrics.

DETAILED DESCRIPTION

Figure 1:
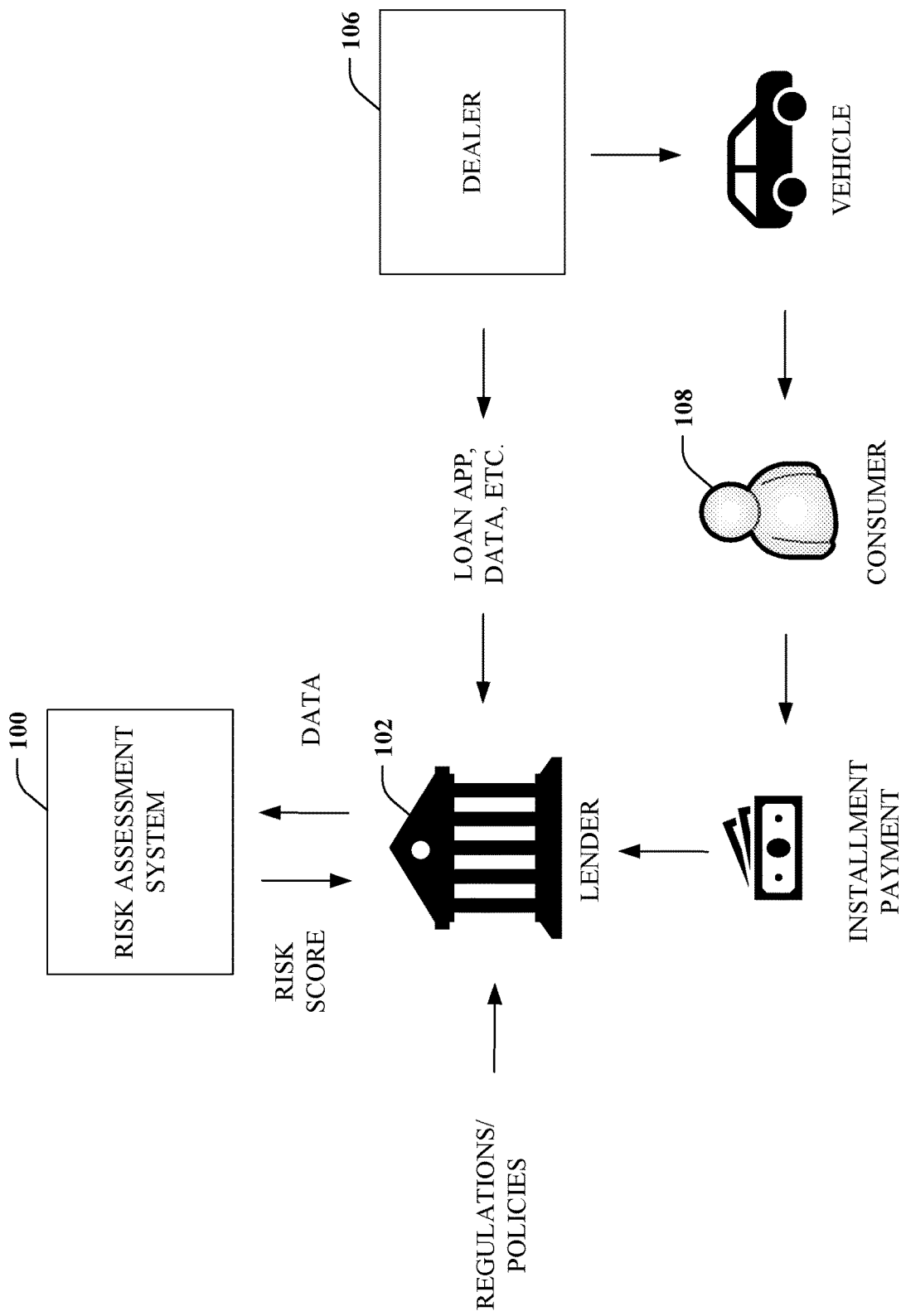
FIG. 1 illustrates an overview of an example implementation.

Financial institutions can collect a large amount of data associated with direct and indirect lending to ensure compliance with local or federal regulations or other internal or external policies. For example, a bank can receive fifty or more metrics per month from thousands of dealerships. Received metrics can be provided in a reporting structure. Moreover, metrics can be analyzed to verify whether or not regulation requirements are being met. For instance, consideration can be given to a metric capturing adjustments in terms of rate or waiver of stipulations (e.g., income proof, address proof . . . ) or a metric associated with cross selling (e.g., extended warranty, wheel replacement . . . ) to determine whether regulatory violations occurred with respect to adjustments and cross selling. However, metrics are conventionally analyzed in isolation, which fails to account for all metrics or combinations of metrics. Such a selective view of metrics independently may not provide a clear or accurate indication of wrongdoing or irregular behavior with respect to regulation compliance.

Details provided herein generally pertain to risk assessment. Metrics can be derived for a particular third-party retailer, such as a dealer, from input data associated with loan origination, funding, and collection, for example. Data distribution of metrics can be analyzed to identify a subset of metrics, or key metrics, that are outside a predetermined threshold, for instance indicating non-adherence to a regulation. Weights can be assigned to the subset of metrics to account for significance of the metric in a particular context. A weighted score can be produced from the weighted subset of metrics, for instance by way of aggregation. A dealer, or other third party, can be labeled high risk or low risk based on the weighted score. In one particular instance, riskiness can correspond to compliance risk related to potential violations of regulations or policies. Further, dealers can be ranked relative to each other based on the weighted score. Dealers and rankings can be presented by way of a graphic, and optionally interactive, scorecard. In the context of compliance risk associated with adherence to regulations or policies, the provided holistic view of a dealer can provide assurance regarding compliance as well as aid in developing strategies to improve dealer relations with respect to regulatory compliance, among other things. In one instance, risk assessment can drive recommendations or suggestions for dealers to reduce risk.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a high-level overview of an example implementation is illustrated and described. As depicted, the implementation includes risk assessment system 100 communicatively coupled to lender 102, such as a financial institution (e.g., bank, credit union . . . ). The lender 102 can be subject to various regulations, or internal or external policies associated with lending. The risk assessment system 100 can assist the lender 102 in ensuring the lender 102 complies with such regulations or policies. The risk assessment system 100 can be implemented in various ways. For example, the risk assessment system 100 can operate as an application on one or more computers of the lender 102 or as an external network-accessible service, among other implementations.

The lender 102 is also communicatively coupled to the dealer 106. More specifically, one or more computers of the lender 102 are coupled with one or more computers of the dealer 106 in a manner that enables communication such as over a network (e.g., Internet). The dealer 106 offers vehicles (e.g., automobiles, boats, motorcycles . . . ) for sale. Consumers can purchase the vehicles in cash or by way of direct lending between a consumer 108 and the lender 102. However, indirect lending, or indirect loans, is much more popular than direct lending for financing due at least to convenience. Rather than the consumer 108 contacting the lender 102 directly, the consumer 108 can apply for credit or a loan indirectly through the dealer 106. For example, the dealer 106 can accept a credit application from the consumer 108 and send the application to the lender 102 to assist the consumer 108 in acquiring financing for a vehicle purchase. The consumer 108 can receive the vehicle and subsequently make installment payments to the lender 102 in accordance with terms of a loan offer executed with assistance from the dealer 106.

In order to encourage the consumer 108 to purchase a vehicle, the dealer 106 can make a few adjustments to terms of a loan contract including rate, as well as waive various requirements (e.g., income proof, address proof . . . ). Further, the dealer 106 can engage in cross selling of an extended warranty, wheel replacement, or maintenance plan, for example, wherein the associated cost is added to a loan for the vehicle. However, adjustments and cross selling above a certain threshold can lead to regulatory or policy violations. Despite the fact that a third party or intermediary is utilized to aid in acquiring a loan for the consumer 108, the lender 102 is still responsible for regulatory and policy adherence.

In accordance with an agreement between the dealer 106 and the lender 102, the dealer 106 can provide certain data, at least a portion of which can be included with a loan application. The lender 102 can collect this and other data and provide the data to the risk assessment system 100. In return, the lender 102 can acquire information associated with compliance with applicable regulations or policies. Moreover, the lender 102 can provide data to the risk assessment system 100 at various loan stages including, origination (e.g., customer type, loan to value, acquisition fee, stipulations, pricing accommodation . . . ), funding (e.g., backend charges, insurance, extended warranty, gap insurance . . . ), and collection (e.g., delinquency, days past due, charge off . . . ). In one instance, a scorecard or the like can be returned including a risk score associated with compliance as well as other information including significant metrics or attributes influencing the score. Consequently, a holistic approach is taken to analyze multiple metrics and output risk information regarding the risk of noncompliance with regulations or policies.

Outputted risk information can be useful as evidence of compliance, for example in response to an audit or the like. Further, the risk information can be informative for the lender 102 in evaluating a relationship with a dealer 106, such that the relationship may be altered or discontinued based the risk score. Furthermore, the risk information can be utilized to generate recommendations or suggestions that a dealer 106 could implement to improve the risk score and enhance or continue the relationship with the lender 102

Figure 2:
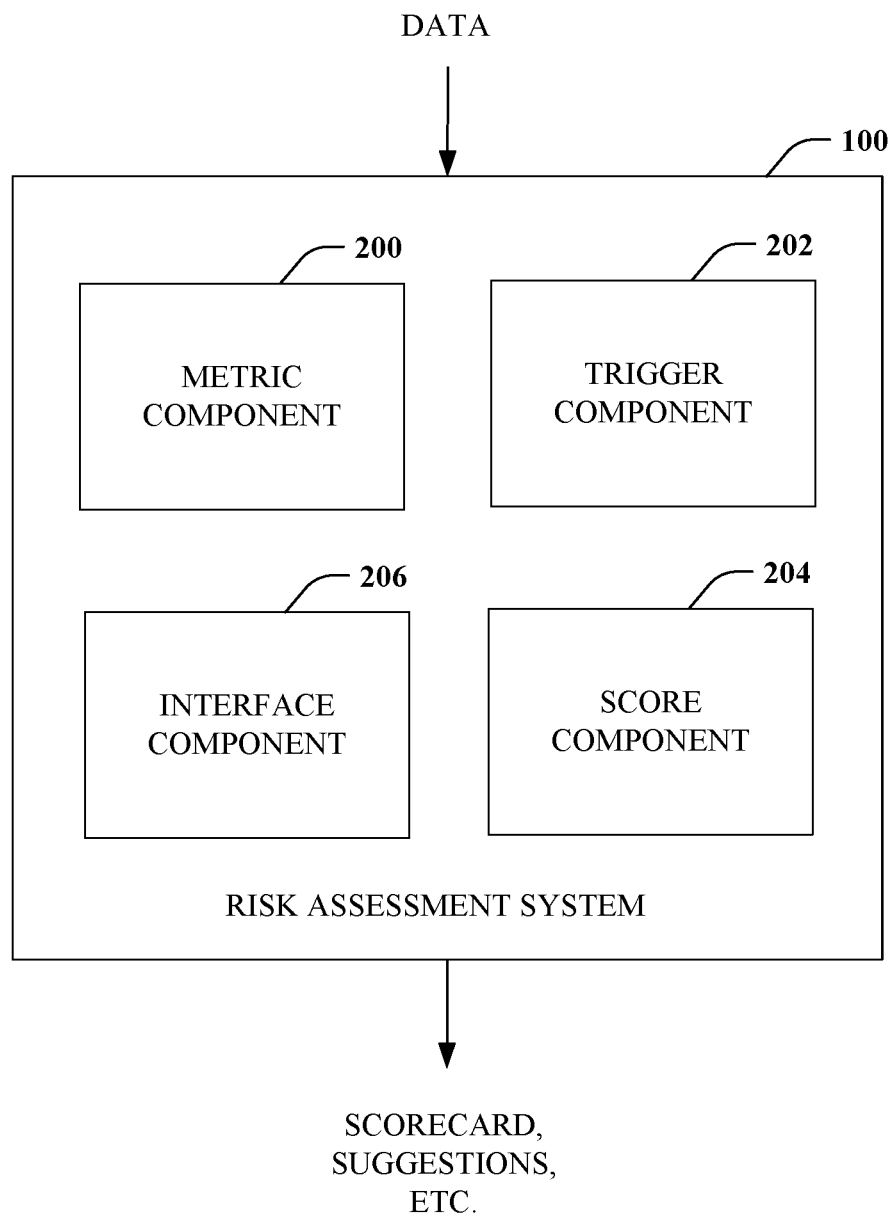
FIG. 2 is a schematic block diagram of a risk assessment system.

FIG. 2 depicts a sample implementation of the risk assessment system 100 in further detail. The risk assessment system 100 receives, retrieves, or otherwise obtains or acquires data, for example regarding indirect loans, and returns one or more risk scores, among other things, associated with compliance with regulatory or policy requirements. In one instance, suggestions can be determined and returned regarding improvements to operations that reduce risk and improve the risk score. The risk assessment system 100 includes metric component 200, trigger component 202, score component, 204, and interface component 206.

The metric component 200 provides a means to derive metrics associated with third-party retailers, such as dealers. Data received from various sources can pertain to loan details including information about origination (e.g., loan to value ratio, number of stipulations, fees . . . ), collection (e.g., early payment, past due . . . ) and funding (e.g., insurance changes, extended warranty . . . ). Derivation of metrics includes assigning data to corresponding metrics and, as needed, computing a metric. In addition to deriving metrics based on loan application details, the metric component 200 can also aggregate metrics at a dealer level in proportion to booked loans. For example, it can be determined that a dealer books fifteen loans and one of those loans was past due (e.g., collection information). Accordingly, it can be noted that about seven percent of loans booked by the dealer result in past due payment.

The trigger component 202 is a mechanism that provides a means to apply one or more thresholds to metrics to identify whether or not a metric likely contributes to a level of riskiness associated with compliance. Statistical analysis, including univariate analysis, can be employed to determine threshold values associated with metrics. In accordance with one embodiment, a ninety fifth percentile set can be a threshold limit. As a result, the top five percent of data can be considered as impactful with respect to non-adherence to regulations. The trigger component 202 can thus utilize statistical means to identify independent variables that influence a dependent or response variable associated with compliance risk. Metrics with values that exceed a trigger indicative of acceptable performance can be deemed key metrics for purposes of determining risk associated with non-compliance.

Figure 3:
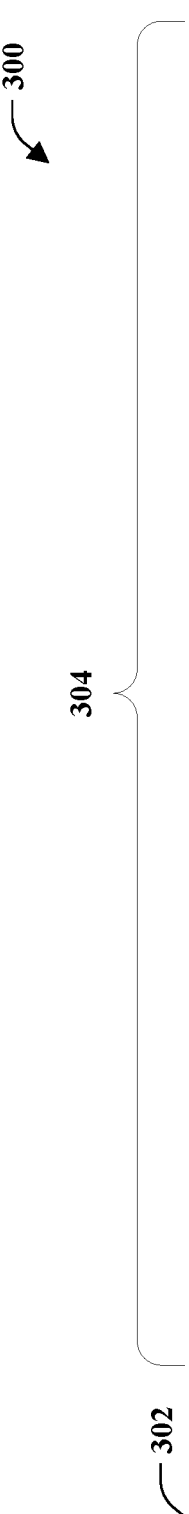
FIG. 3 is a table of results of statistical analysis with respect to various metrics.

Turning attention briefly to FIG. 3, a table 300 is illustrated that includes a plurality of dealer-level attributes or metrics 302 and corresponding statistical values 304 associated with the metrics 302. The dealer-level metrics 302 include proportions of loans associated with acquisition fees greater than five hundred dollars, nonprime customers, as well as thirty and ninety day delinquencies. The statistical values 304 are standard deviation, maximum, median, mode and several different percentages associated with corresponding metrics 302. Observe the values of the ninety-fifth percentile associated with each dealer-level metric 302. These values can be deemed to represent a threshold value beyond which such a metric is considered a contributor to overall compliance risk. The trigger component 200 can compute this threshold value or alternatively be provided with the threshold value by a user.

The score component 204 of FIG. 2 is a mechanism that assigns a score to dealers representing risk. This score can be compared to one or more thresholds to determine risk as high, low, neutral or some other classification. For example, by analyzing score distribution, an extreme ten percent (e.g., score greater than five) can be tagged as high risk. Further, the score provides a basis for comparing risk between parties. For example, dealers can be rank ordered based on risk level utilizing the score. In one instance, a logical regression model can be applied to segment and rank order dealers based on risk.

Figure 4:
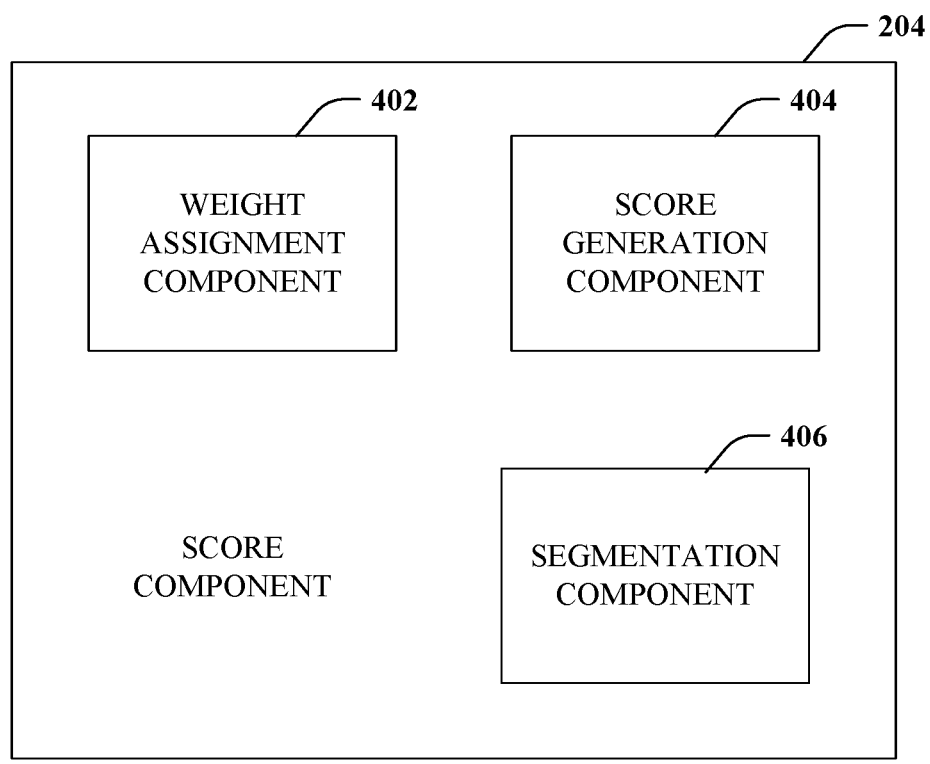
FIG. 4 is a schematic block diagram of a score component.

Turning attention for a moment to FIG. 4, the score component 204 is illustrated in further sample detail to facilitate clarity and understanding. As shown, the score component 204 includes weight component 402. The weight component 402 assigns weights to each metric, or independent variable, to either increase or decrease influence of the metric on a risk level. For example, the weight can have a decimal value of from zero to one, wherein one is the greatest influence and zero is no influence. The weight assigned can correspond to a business judgement, and the weight can be determined and applied manually based on business significance. Alternatively, the weight can be determined and applied automatically. For example, the weight can be inferred from historical data and adjusted automatically.

The score generation component 404 generates a score associated with a dealer reflecting compliance risk with respect to laws, regulations, or policies. The score generation component 404 can utilize weighted metrics as a basis for the score. Here, weighted metrics for a number of metrics can contribute to the score. For example, the score generation component 404 can aggregate a number of weighted key metrics such as by summing metric weights.

The segmentation component 406 can segment dealers into separate classes or categories based on the generated score. In one instance, the segmentation can be binary, namely high risk or low risk. A threshold can be established with respect to scores to enable classifying a dealer as high risk or low risk. For example, a score higher than five is high risk while a score equal or less than five is low risk. Alternatively, there can be more than two classes delineating risk severity, such as high, medium, and low, extremely high, high, moderate, and low, or high, moderately high, moderate, moderately low, and low.

Returning to FIG. 2, the risk assessment system 100 also includes an interface component 206. The interface component 206 can be embodied as an application programming interface to enable communication between computer systems for example in acquiring and providing input and output data. In another embodiment, the interface component 206 can be a graphic generator or graphical user interface. In one instance, the interface component 206 can generate a dealer scorecard or the like to present results of risk assessment. The scorecard can graphically present a score capturing risk as well as significant metrics or attributes influencing the score. Further, the scorecard can be interactive to enable manipulation by way of filtering, for example. In this way, the scorecard can be altered to allow a user to view most pertinent data. Further, the scorecard can also provide recommendations, or suggestions, with respect to operational or other changes likely to improve a dealer risk score based on significant metric values and actions that influence these values.

Figure 5:
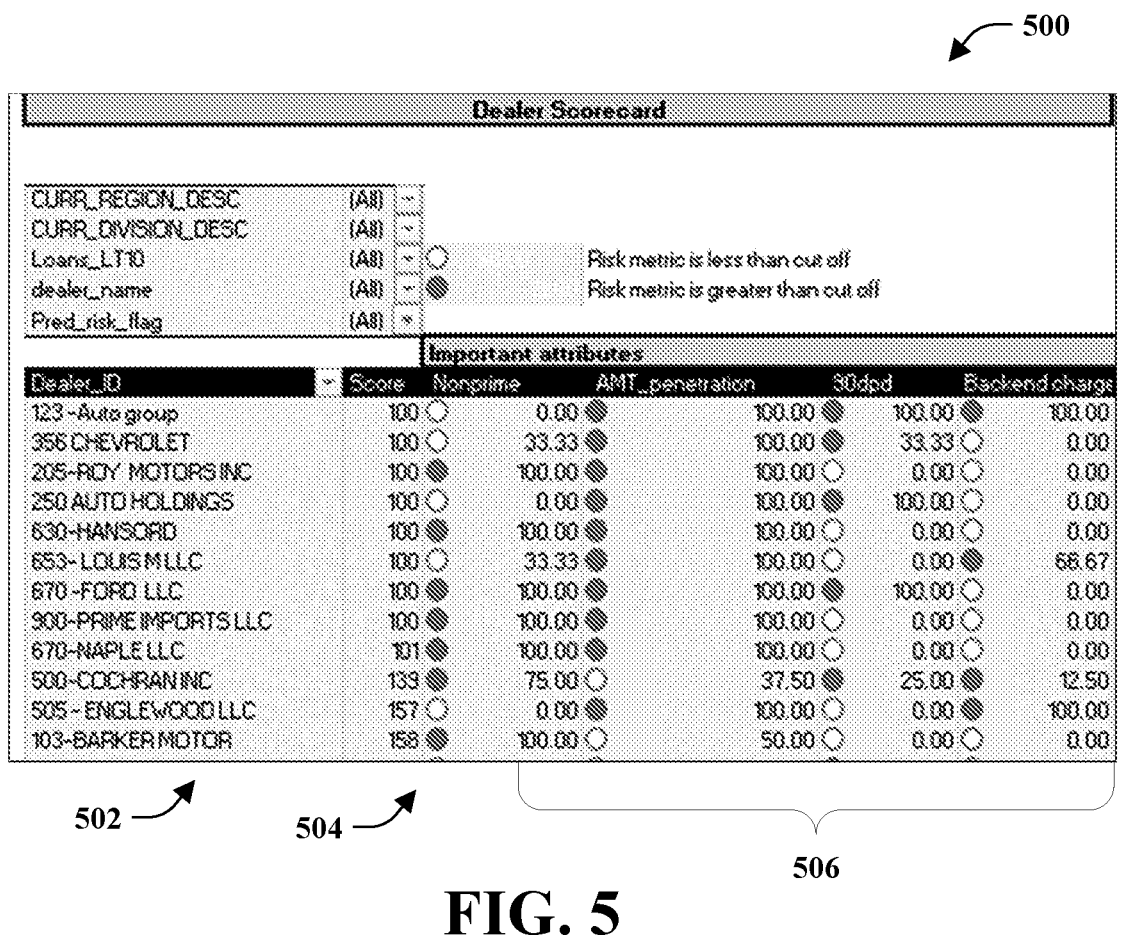
FIG. 5 is a screenshot of a sample scorecard.

FIG. 5 depicts a screenshot of a sample scorecard 500 that can be generated. Here, the scorecard 500 lists dealer identifiers 502 as well as corresponding overall score 504 and scores associated with significant metrics 506 influencing the overall score. A graphical indicator is positioned next to each numeric score that can indicate whether or not the risk metric is higher or lower than a particular threshold. For instance, the indicator can be colored red to identify those scores representative of high risk. Further, the scorecard can filter dealers one many ways. For example, dealers can be listed in order based on risk and level of risk such that dealers with highest risk are presented first. Of course, the scorecard 500 is only one of many different manners in which output from the risk assessment system can be presented. Various other combinations of text, icons, controls, images, audio, or video can be employed.

Generation of the scorecard by the interface component 206 of FIG. 2 enables further analysis by human users at a financial institution. For example, the scores can be utilized to determine dealer deficiencies and suggest remedies. However, such a process can also be automated such that the risk assessment system 100 can analyze dealer scores and automatically recommend changes to improve the score. For example, it can be determined that the cost of certain additional add-ons, such as an extended warranty, exceeds a threshold cost and a recommendation can be produced suggesting reduction of that cost.

For purposes of aiding clarity and understanding with respect to aspects of the subject disclosure, an example is provided hereinafter. It is to be understood that this example is solely one particular embodiment of various disclosed aspects and is not meant to be limiting. The example identifies functionality that can be performed by the risk assessment system 100 including metric component 200, trigger component 202, and score component 204.

Turning attention to FIG. 6, a collection of data 600 associated with scoring a dealer is presented. As shown, the data 600 pertains to a single dealer, namely "ABC." At 602, a set of data is provided with respect to loans booked by the dealer. In addition to loan number identifier, data is provided with respect to metrics associated with each loan including whether or not the loan was non-prime and was past due along with fees associated with particular items including additional gap insurance. At 604, the collected data is aggregated for the dealer. Here, the number of loans booked by the dealer ABC is thirteen. Of those thirteen loans, three were nonprime, one was past due, and one had backend charges. At 606, the proportion of booked loans is computed. From the set of thirteen booked loans, twenty-three percent were non-prime, and eight percent were past due and had backend charges. At 608, the proportions are compared to a predetermined threshold and assigned a given weight if the threshold is exceeded and otherwise assigned a value of zero. These values are termed risk flags. The risk flags are subsequently added together to produce a weighted score. Here, there are risk flags for nonprime loans and backend changes resulting in a weighted score of two for dealer ABC. Subsequently, this score can be compared with another threshold to classify the dealer as high risk or low risk, for example.

The above example provides solely one means of computing risk associated with a dealer. There are many other manners to capture risk based on a combination of metrics, as opposed to utilizing one or more single metrics as a measure of risk independently. Variations of the aforementioned approach are also possible and contemplated. In one particular embodiment, for example, the extent to which a value exceeds a threshold value can be considered and taken into account by the risk score. In this manner, a metric with a value that just exceeds a threshold will be treated differently than a metric that grossly exceeds the threshold with respect to computation of the risk score.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, among others, can automate certain mechanisms or processes performed thereby to make portions of the systems and methods more adaptive as well as efficient and intelligent. The risk assessment system 100 can employ such mechanisms in a variety of ways. By way of example, and not limitation, the risk assessment system 100 can be implemented by way of various mechanisms to perform intelligent classification. For instance, decision trees, neural networks or other models can be trained to identify and weight metrics and perform risk classification based thereon. In one instance, a supervised learning approach can be employed to classify a dealer as high risk or low risk based on a trained predictive model, wherein model can be trained with training data including booked loans and associated metrics and risk labels (e.g. high, moderate, low).

Figure 7:
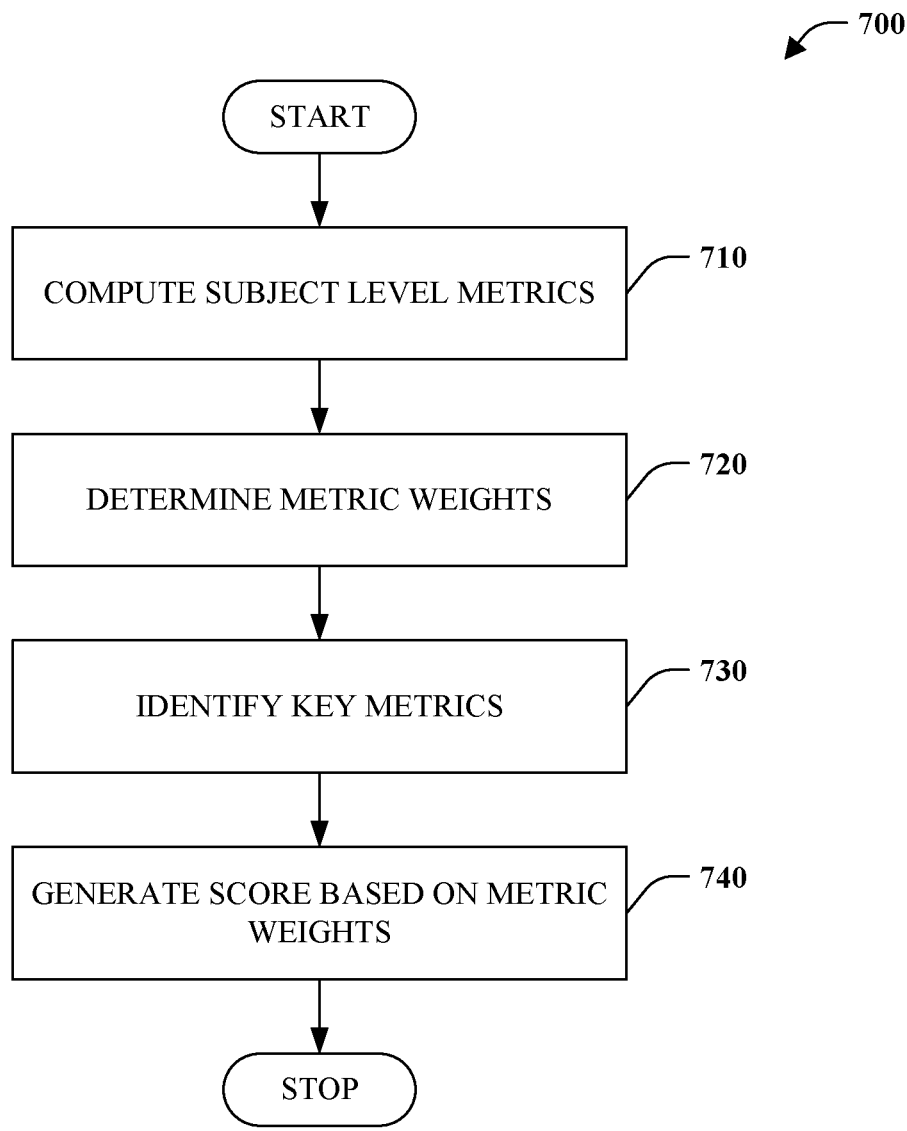
FIG. 7 is a flowchart diagram of a risk assessment method.
Figure 8:
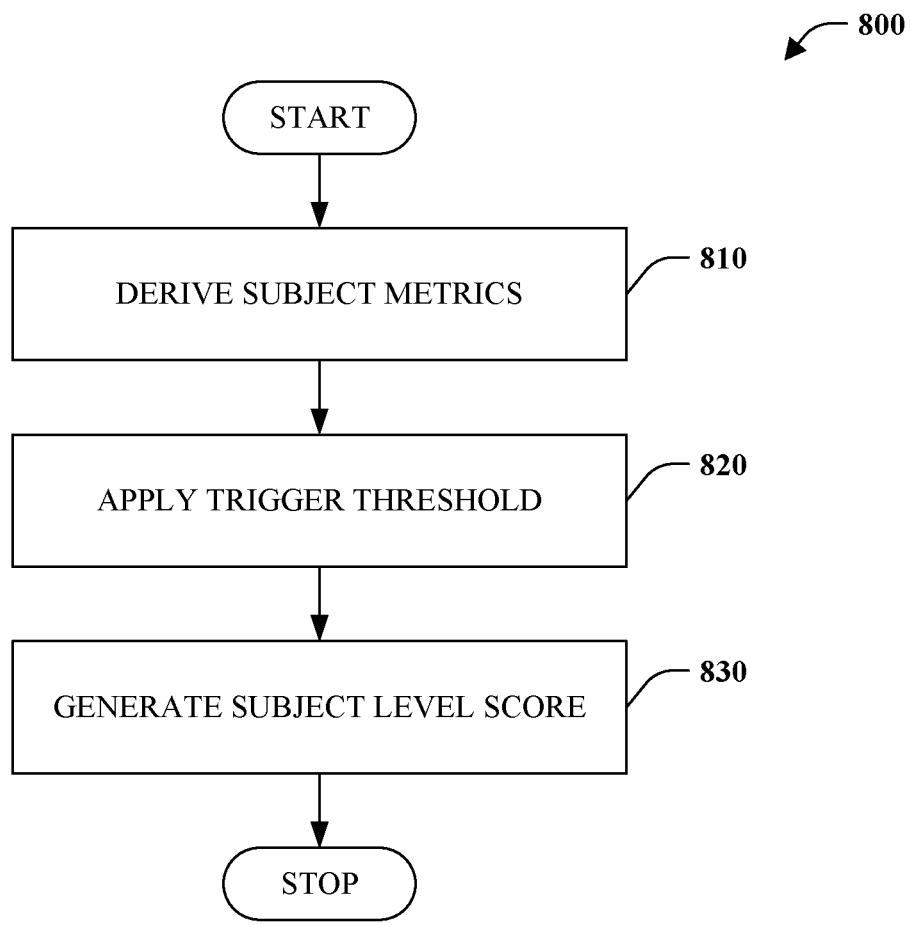
FIG. 8 is a flow chart diagram of a method of risk scoring.
Figure 9:
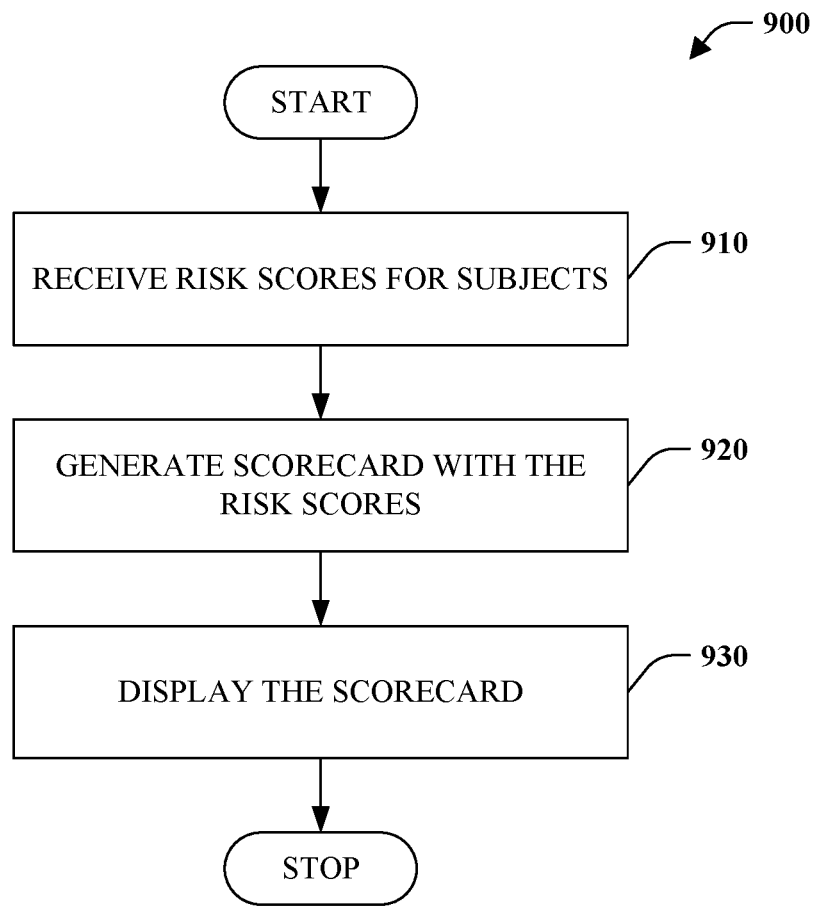
FIG. 9 is a flow chart diagram of a score presentation method.

In view of the exemplary systems described above, methods that may be implemented in accordance with the disclosed subject matter will be better appreciated with reference to flow chart diagrams of FIGS. 7-9. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 7 illustrates a risk assessment method 700. The method 700 can be performed by the risk assessment system 100 and in one implementation can be implemented by a machine learning model. At reference numeral 710, subject-level metrics are computed. For example, metrics are computed at a dealer specific level. In one instance, number of loans booked by, or originating from, the dealer can be utilized as a basis for computing proportions associated with a plurality of metrics. At 720, weights for respective metrics are determined. Such weights can represent extent of influence a metric has on a final score associated with risk, for example in terms of policy or regulation compliance. The weights can be manually defined to capture business judgement or automatically determined or learned based on historical information. At numeral 730, key metrics can be identified from the set of metrics computed. This can correspond to an optional optimization to reduce the number of metrics contributing to a final score. For example, a threshold can be set with which metrics can be filtered such that metrics within the threshold are filtered out and metrics outside the threshold are identified as key metrics. In this manner, outliers can correspond to non-adherence to policy or regulations. At 740, a score is computed based on all metrics, or solely key metrics, and weights associated with the metrics. In one instance, the weights can be added together to produce the score.

FIG. 8 illustrates a method 800 of risk scoring. The method 800 can be performed by the risk assessment system 100 including metric component 200, trigger component 202, and score component 204.

At reference numeral 810, metrics are derived for a subject such as a dealer. Data or metrics can be received, retrieved, or otherwise obtained or acquired as input, for example associated with loan origination (e.g., customer type, loan to value, acquisition fee, stipulations . . . ), funding (e.g., backend charges, insurance, warranty . . . ), and collection (e.g., delinquency, past due, charge off). From this input, data can be derived at a subject level. In one instance, a number of loans booked by a particular dealer can be determined as well as aggregated metrics for the booked loans. For example, it can be determined that a dealer booked twenty loans and ten had past due payments. Similarly, it can be that two loans included gap insurance and three were nonprime. Further, the data can be computed and expressed in terms of proportions with respect to total booked loans. By way of example, if a dealer booked twenty loans and ten were determined to be past due, the past due metric for the dealer can be fifty percent.

At 820, a trigger threshold is applied to the distribution of subject metrics to identify metrics that influence a final result. The trigger threshold can be computed, learned, or manually defined. For example, the trigger threshold can be ninety five percent, such that the top five percent are deemed outliers that contribute to overall risk score. For instance, by univariate analysis over loans booked by several dealers it can be determined that the threshold for a past due metric is twelve percent. In other words, if more than twelve percent of a dealer's loans are past due, this metric can be flagged an outlier or non-adherence. Alternatively, if twelve or less percent of a dealer's loans are past due, the metric can be flagged as such or otherwise filtered out. For example, dealer-level metrics in comparison to a threshold can be tagged as a one or zero, wherein one indicates a non-adherence and zero denoted adherence. In other words, key metrics are identified by applying a trigger threshold.

At 830, a subject-level score can be generated such as a dealer-level risk score associated with policy and regulation compliance. Key metrics identified at 720 can be utilized as bases for computing a score. By way of example, weights associated with the key metrics can be summed to result in a final score. Further, the final score can be utilized as a basis to label a dealer has high risk or low risk or some other risk designation. For example, a threshold comparison can be performed such that if the final risk score is greater than a threshold such as five, the dealer can be classified as high risk, and otherwise classified as low risk. In this manner, dealers can be segmented by risk. Further, dealers can be rank ordered based on respective risk levels or risk scores, for instance from high to low or low to high.

FIG. 9 is a flow chart diagram of a method 900 of score presentation. The method 900 can be performed by the risk assessment system 100 including the interface component 206. At 910, risk scores for one or more subjects are received, retrieved, or otherwise obtained or acquired. For example, determined risk scores for one or more dealers can be received in which the risk scores capture the risk of non-compliance with one or more policies or regulations. At numeral 920, a scorecard can be generated including the one or more risk scores received. The score card can be a graphic that identifies the subject, such as a dealer, and corresponding risk score. In one instance, risk level can be indicated graphically such as in terms of color (e.g., red for high risk) or other highlighting means. Additionally, other scores or metrics that contributed to the risk score can be presented, including key metric values. Further, the scorecard can display multiple subjects in rank order such as from highest risk to lowest risk or vice versa. At 930, the generated scorecard can be conveyed for display on a display device. In accordance with one aspect the displayed scorecard can be interactive such that changes, filtering, or like alteration can be made to customize the view. Further, the scorecard embodied as a graphical user interface can enable further communication between a dealer and a lender. For example, the scorecard can identify suggested changes that would reduce the risk score based on a human interpretation of the data or key metrics and actions that affect the key metrics.

Aspects of the subject disclosure have been described largely in the context of indirect lending and dealers. However, the subject innovation is not so limited. In fact, there are various other contexts that can benefit from aspects of the disclosure analyzing a combination of metrics. First, aspects need not relate solely to loans and dealers. Any third-party retailer can offer a line of credit to customers for purchases though a financial institution. Furthermore, consider the insurance industry and insurance agents. Rather than relying on a single metric, such as polices sold, to assess an agent other metrics can be considered including the type of policy or cost of policy as well as customer satisfaction. This will provide a more holistic and complete view of an agent's performance. Aspects of the disclosure can be employed to utilize a plurality of metrics or factors in evaluating performance of an agent. A like approach can be performed to assess performance of any other sales or customer service team.

Aspects of the subject disclosure concern a technical problem regarding risk scoring. In multidimensional data spaces associated with complex entities, it is difficult to identify and usefully employ a combination of metrics, or independent variables, that contribute to an overall risk score, such as a risk of non-compliance with policies or regulations. Conventionally, this problem has been avoided by considering solely a single metric. However, no single metric can give a clear and accurate indication of compliance and risk. The problem is solved at least by identifying a combination of key risk metrics statistically or predictively, and along with weights reflecting business significance, computing a risk score.

The subject disclosure provides for various products and processes that are configured to perform risk assessment and various functionality related thereto. What follows are one or more example systems and methods.

A system comprises a processor coupled to a memory that includes instructions that when executed by the processor cause the processor to: derive a set of metrics from data associated with a third party with respect to performance of an activity; identify a subset of metrics of the set of metrics that exceed a first predetermined threshold of acceptable performance; apply a weight to the subset of metrics based on significance of the metric; compute a weighted score from aggregation of the weighted subset of metrics; and classify the third party based on comparison of the weighted score to a second predetermined threshold. In accordance with one aspect, the third party is a retailer and the activity is origination of a loan for a consumer through a financial institution. The weighted score can capture a risk level with respect to adherence to policies or regulations regarding indirect lending. In one instance, the retailer can be an automobile dealer and the financial institution can be a bank. The set of metrics can pertain to one or more of loan origination, funding, or collection, and the significance of the metric is business significance. The system further comprises instructions that cause the processor to generate a graphical scorecard that identifies multiple third parties and associated weighted score. The instructions can further cause the processor to rank order a plurality of third parties based on the weighted score as well as implement a machine learning model for classifying the third party.

A method comprises executing, on a processor, instructions that cause the processor to perform operations comprising: determining a set of metrics from data associated with a third-party retailer originating a loan for a consumer through a financial institution; identifying a subset of metrics of the set of metrics that exceed a first predetermined threshold; applying a weight to the subset of metrics based on significance of the metric; computing a weighted score from aggregation of weighted metrics of the subset of metrics; and classifying the third-party retailer based on comparison of the weighted score to a second predetermined threshold. The operations further comprise determining the set of metrics pertaining to one or more of loan origination, funding, or collection. Further, the operations comprise deriving the first predetermined threshold through statistical analysis of metrics associated with multiple third-party retailers. The operations also include applying a weight to the subset of metrics that is business significant. The operations additionally comprise computing the weighted score capturing risk with respect to compliance with one or more indirect lending regulations. The operations further comprise generating a graphical scorecard that identifies multiple third-party retailers and the classification of the multiple third-party retailers. Further, the operations comprise generating a graphical scorecard comprising the weighted score.

A method comprises determining a set of metrics associated with a dealership originating a loan for a consumer through a bank, identifying one or more outliers from the set of metrics based on a threshold, assigning a weight to the one or more outliers based on business significance, computing an aggregate score from the one or more outliers and assigned weights, and classifying the dealership as high risk or low risk in terms of adherence with regulatory requirements associated with indirect lending based on the score. The method further comprises determining the set of metrics from information pertaining to one or more of loan origination, funding, or collection. Further, the method comprises generating a graphical scorecard that identifies multiple third-party retailers ranked based on respective aggregate scores. The method further comprises conveying, for display on a display device, the graphical scorecard.

Turning to FIG. 10, a dealer-level table 1000 is illustrated. The table provides sample dealer-level metrics 1010 and associated definitions 1020 associated with a particular embodiment. Loan application details regarding origination (e.g., credit score, loan to value ratio, acquisition fee, document fee, stipulations . . . ), collections (e.g., early payment default, past due, charge off), and funding (e.g., insurance charges, extended warranty, dealer accommodation . . . ) can derived into associated dealer-level metrics 1010. Further, the metrics 1010 are aggregated at a dealer level in proportion to booked loans. As examples, "nonprime_ratio" represents a proportion of booked loans to loans to nonprime customers, and "First_Payment_Default" corresponds to a proportion of booked loans to loans with a first payment default. Computation of these metrics 1010 can be performed by the metric component 200 if FIG. 2 in one instance.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 11:
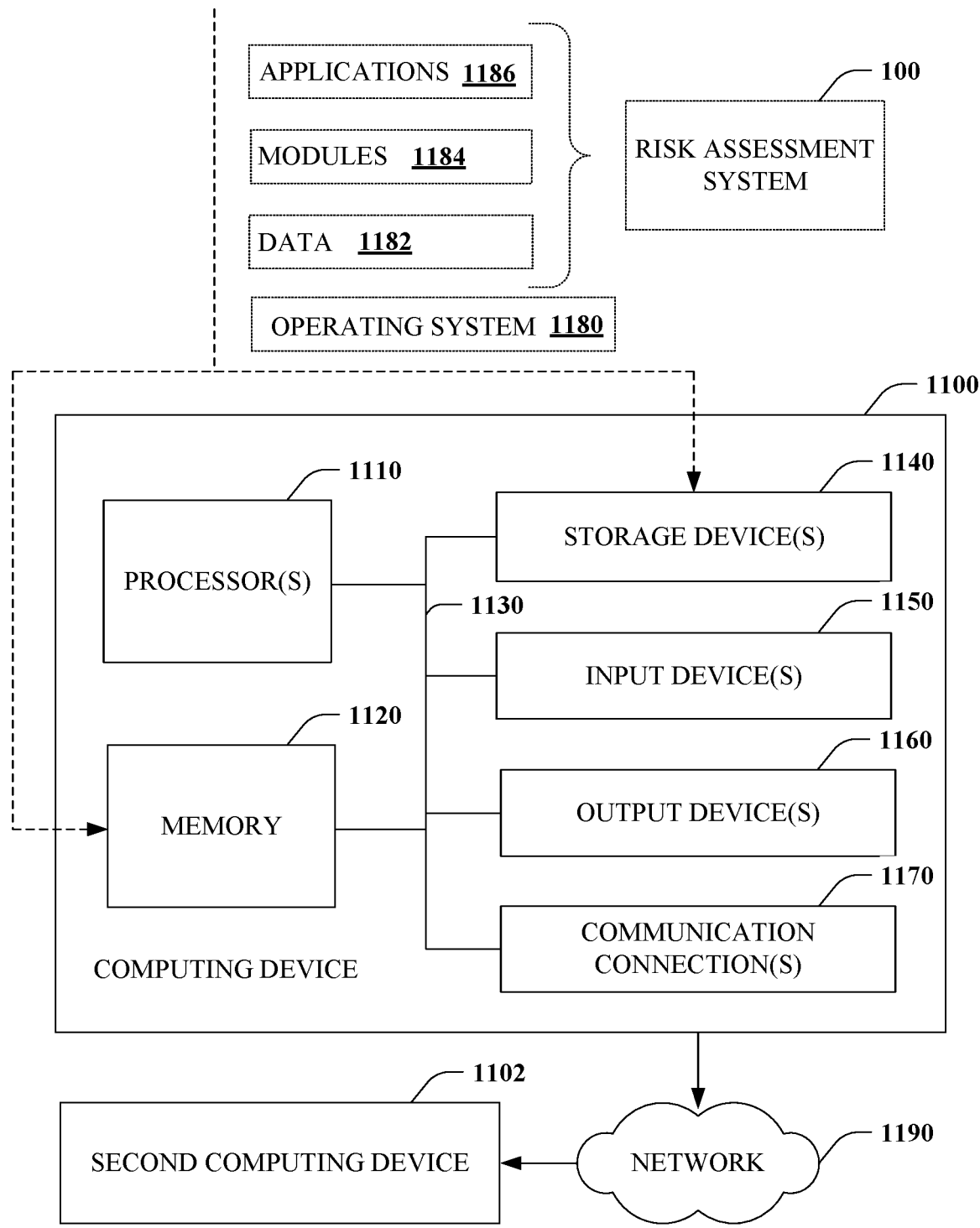
FIG. 11 is a schematic block diagram illustrating a suitable operating environment for aspects of the subject disclosure.

To provide a context for the disclosed subject matter, FIG. 11 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 11, illustrated is an example computing device 1100 (e.g., desktop, laptop, tablet, watch, server, hand-held, programmable consumer or industrial electronics, set-top box, game system, compute node . . . ). The computing device 1100 includes one or more processor(s) 1110, memory 1120, system bus 1130, storage device(s) 1140, input device(s) 1150, output device(s) 1160, and communications connection(s) 1170. The system bus 1130 communicatively couples at least the above system constituents. However, the computing device 1100, in its simplest form, can include one or more processors 1110 coupled to memory 1120, wherein the one or more processors 1110 execute various computer executable actions, instructions, and or components stored in the memory 1120.

The processor(s) 1110 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1110 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1110 can be a graphics processor unit (GPU) that performs calculations with respect to digital image processing and computer graphics.

The computing device 1100 can include or otherwise interact with a variety of computer-readable media to facilitate control of the computing device to implement one or more aspects of the disclosed subject matter. The computer-readable media can be any available media that is accessible to the computing device 1100 and includes volatile and nonvolatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1100. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1120 and storage device(s) 1140 are examples of computer-readable storage media. Depending on the configuration and type of computing device, the memory 1120 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1100, such as during start-up, can be stored in nonvolatile memory, while volatile memory can act as external cache memory to facilitate processing by the processor(s) 1110, among other things.

The storage device(s) 1140 include removable/non-removable, volatile/non-volatile storage media for storage of vast amounts of data relative to the memory 1120. For example, storage device(s) 1140 include, but are not limited to, one or more devices such as a magnetic or optical disk drive, floppy disk drive, flash memory, solid-state drive, or memory stick.

Memory 1120 and storage device(s) 1140 can include, or have stored therein, operating system 1180, one or more applications 1186, one or more program modules 1184, and data 1182. The operating system 1180 acts to control and allocate resources of the computing device 1100. Applications 1186 include one or both of system and application software and can exploit management of resources by the operating system 1180 through program modules 1184 and data 1182 stored in the memory 1120 and/or storage device(s) 1140 to perform one or more actions. Accordingly, applications 1186 can turn a general-purpose computer 1100 into a specialized machine in accordance with the logic provided thereby.

All or portions of the disclosed subject matter can be implemented using standard programming and/or engineering techniques to produce software, firmware, hardware, or any combination thereof to control the computing device 1100 to realize the disclosed functionality. By way of example and not limitation, all or portions of the risk assessment system 100 can be, or form part of, the application 1186, and include one or more modules 1184 and data 1182 stored in memory and/or storage device(s) 1140 whose functionality can be realized when executed by one or more processor(s) 1110.

In accordance with one particular embodiment, the processor(s) 1110 can correspond to a system on a chip (SOC) or like architecture including, or in other words integrating, both hardware and software on a single integrated circuit substrate. Here, the processor(s) 1110 can include one or more processors as well as memory at least similar to the processor(s) 1110 and memory 1120, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the risk assessment system 100 and/or functionality associated therewith can be embedded within hardware in a SOC architecture.

The input device(s) 1150 and output device(s) 1160 can be communicatively coupled to the computing device 1100. By way of example, the input device(s) 1150 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1160, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1150 and output device(s) 1160 can be connected to the computing device 1100 by way of wired connection (e.g., bus), wireless connection (e.g., Wi-Fi, Bluetooth . . . ), or a combination thereof.

The computing device 1100 can also include communication connection(s) 1170 to enable communication with at least a second computing device 1102 by means of a network 1190. The communication connection(s) 1170 can include wired or wireless communication mechanisms to support network communication. The network 1190 can correspond to a local area network (LAN) or a wide area network (WAN) such as the Internet. The second computing device 1102 can be another processor-based device with which the computing device 1100 can interact. For example, the computing device 1100 can form part of a network service platform that exposes the risk assessment system 100 as a service to the second computing device 1102. In one implementation, the computing device 1100 can execute functionality regarding risk classification with respect to parties and the second computing device 1102 can be a device that receives results, such as a scorecard with corresponding score, from the computing device 1100. In another implementation, the computing device 1100 can be associated with a financial institution and the second computing device 1102 associated with a retailer, such as a dealer, data regarding a loan can be transmitted over a network from the second computing device 1102 to the computing device 1100 for further processing.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
    a processor coupled to a memory that includes instructions that, when executed by the processor, control a plurality of components, the components comprising:

a metric component configured to derive a set of metrics from data associated with a party with respect to performance of an activity;

a trigger component configured to identify a subset of metrics of the set of metrics that exceed a first predetermined threshold of acceptable performance;

a weight assignment component configured to apply a weight to the subset of metrics based on significance of a metric;

a score generation component configured to compute a weighted score from aggregation of the weighted subset of metrics;

a segmentation component configured to classify the party based on comparison of the weighted score to a second predetermined threshold; and an interface component configured to generate a recommendation of a change in action related to a metric from the subset of metrics that improves the weighted score and classification.

2. The system of claim 1, wherein the party is a retailer and the activity is origination of a loan for a consumer through a financial institution.

3. The system of claim 2, wherein the weighted score captures a risk level with respect to compliance with policies or regulations regarding indirect lending.

4. The system of claim 2, wherein the retailer is an automobile dealer and the financial institution is a bank.

5. The system of claim 2, wherein the set of metrics pertain to one or more of loan origination, funding, or collection.

6. The system of claim 2, wherein the significance of the metric is business significance.

7. The system of claim 2, wherein the interface component is further configured to generate a graphical scorecard that identifies multiple parties and associated weighted scores.

8. The system of claim 1, wherein the segmentation component is further configured to rank order a plurality of parties based on the weighted score.

9. The system of claim 1, wherein the segmentation component is further configured to implement a machine learning model for automatically classifying the party.

10. A method, comprising:
executing, on a processor, instructions that cause a plurality of components to perform operations comprising:
determining, by a metric component, a set of metrics from data associated with a third-party retailer originating a loan for a consumer through a financial institution;
identifying, by a trigger component, a subset of metrics of the set of metrics that exceed a first predetermined threshold;
applying, by a weight assignment component, a weight to the subset of metrics based on significance of the metric;
computing, by a score generation component, a weighted score from aggregation of weighted metrics of the subset of metrics; and
classifying, by a segmentation component, the third-party retailer in terms of adherence to regulatory requirements based on comparison of the weighted score to a second predetermined threshold.

11. The method of claim 10, the operations further comprising determining, by the metric component, the set of metrics pertaining to one or more of loan origination, funding, or collection.

12. The method of claim 10, the operations further comprising deriving, by the trigger component, the first predetermined threshold through statistical analysis of metrics associated with multiple third-party retailers.

13. The method of claim 10, the operations further comprising applying, by the weight assignment component, a weight to the subset of metrics that is business significant.

14. The method of claim 10, the operations further comprising computing, by the score generation component, the weighted score capturing risk with respect to compliance with one or more indirect lending regulations.

15. The method of claim 10, the operations further comprising generating, by an interface component, a graphical scorecard that identifies multiple third-party retailers and the classification of the multiple third-party retailers.

16. The method of claim 10, the operations further comprising generating, by an interface component, a graphical scorecard comprising the weighted score.

17. A method, comprising:
executing, on a processor, instructions that cause a plurality of components to perform operations comprising:
determining, by a metric component, a set of metrics associated with a dealer originating a loan for a consumer through a bank;
identifying, by a trigger component, one or more outliers from the set of metrics based on a threshold;
assigning, by a weight assignment component, a weight to the one or more outliers based on business significance;
computing, by a score generation component, an aggregate score from the one or more outliers and assigned weights; and
classifying, by a segmentation component, the dealer as high risk or low risk in terms of adherence with regulatory requirements associated with indirect lending based on the score.

18. The method of claim 17, the operations further comprising determining, by the metric component, the set of metrics from information pertaining to one or more of loan origination, funding, or collection.

19. The method of claim 17, the operations further comprising generating, by an interface component, a graphical scorecard that identifies multiple third-party retailers ranked based on respective aggregate scores.

20. The method of claim 19, the operations further comprising conveying, by the interface component and for display on a display device, the graphical scorecard.

* * * * *